United States Patent
Huang et al.

(10) Patent No.: US 6,941,183 B1
(45) Date of Patent: Sep. 6, 2005

(54) METHOD AND APPARATUS FOR SELECTING TOOLS IN MANUFACTURING SCHEDULING

(75) Inventors: Pai-Cheng Huang, Kaohsiung (TW); Ming-Feng Ou, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 10/811,358

(22) Filed: Mar. 26, 2004

(51) Int. Cl.[7] .................................. G06F 19/00
(52) U.S. Cl. ........................... 700/101; 718/103
(58) Field of Search ................. 700/99, 100, 101; 718/103

(56) References Cited

U.S. PATENT DOCUMENTS 6,790,686 B1 * 9/2004 Purdy et al. ................. 438/14

* cited by examiner

*Primary Examiner*—Leo Picard
*Assistant Examiner*—Sheela S. Rao
(74) *Attorney, Agent, or Firm*—Thomas, Kayden, Horstemeyer & Risley (57) ABSTRACT

A system for manufacturing scheduling for a fabrication system. The fabrication contains a plurality of tool groups, and each of which has at least one tool. The system contains an input/output device, a processor, and a storage device. The processor calculates the tool group count of each tool, and assigns a preference index to each tool accordingly, then derives a preference-based manufacturing schedule.

21 Claims, 8 Drawing Sheets

FIG. 1A (RELATED ART)

| Lot No. | Prod_boby | 1st Op TG | Tools | 1st Op time | Selected Tool |
|---|---|---|---|---|---|
| L1 | TM1234 | TG1 | A,B | 1 | A |
| L2 | TM1235 | TG2 | A,C,D | 1 | C |
| L3 | TM1236 | TG3 | C,E,F | 1 | E |
| L4 | TM1237 | TG4 | E | 1 | E |

| Tool | TG Count | Preference |
|------|----------|------------|
| A | 2 | 2 |
| B | 1 | 1 |
| C | 2 | 2 |
| D | 2 | 2 |
| E | 2 | 2 |
| F | 1 | 1 |

FIG. 4C

| Tool Group | Tool |
|------------|------|
| TG1 | A,B |
| TG2 | A,C,D |
| TG3 | C,E,F |
| TG4 | E |

METHOD AND APPARATUS FOR SELECTING TOOLS IN MANUFACTURING SCHEDULING

BACKGROUND

The present invention relates to manufacturing scheduling, and in particular to a manufacturing scheduling system capable of deriving an optimal manufacturing schedule with respect to various tool preferences.

Semiconductor wafers are processed to produce circuits using a plurality of sequential process steps. Each step can be performed using a plurality of different processing tools. Generally, a fabrication system contains a plurality of tools, wherein tools capable of executing a certain process step are organized into one tool group. The tool can be dedicated to one tool group, or it can belong to multiple tool groups. For the tool shared by different tool groups, the more tool groups it belongs to, the greater the likelihood that it will be in use when required by another tool group. For the tool dedicated to just one tool group, it may remain idle while other tools have wafers waiting to be processed.

Figure 1A:
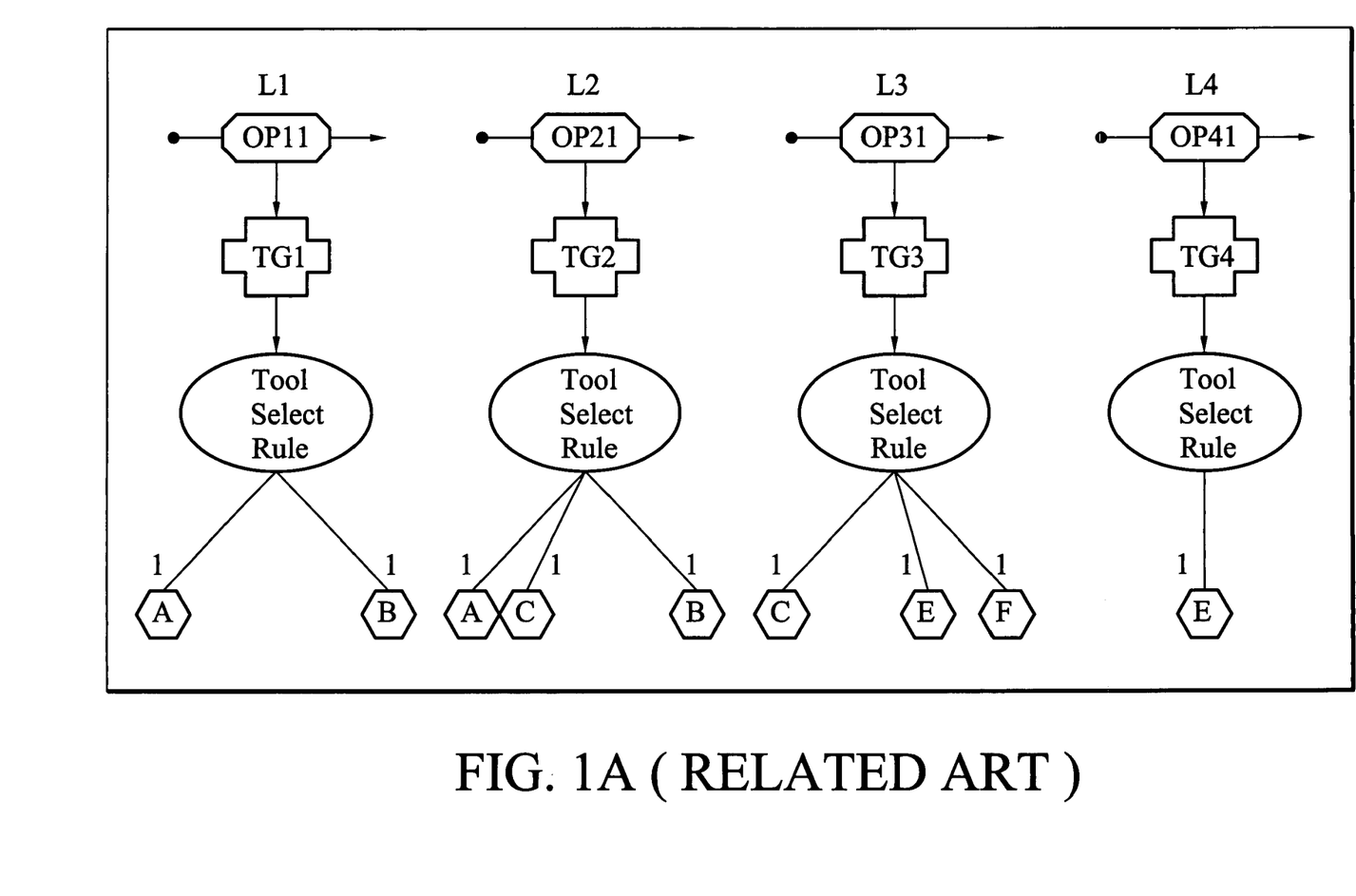
FIGS. 1A to 1C show the operation of conventional manufacturing scheduling.
Figure 1B:
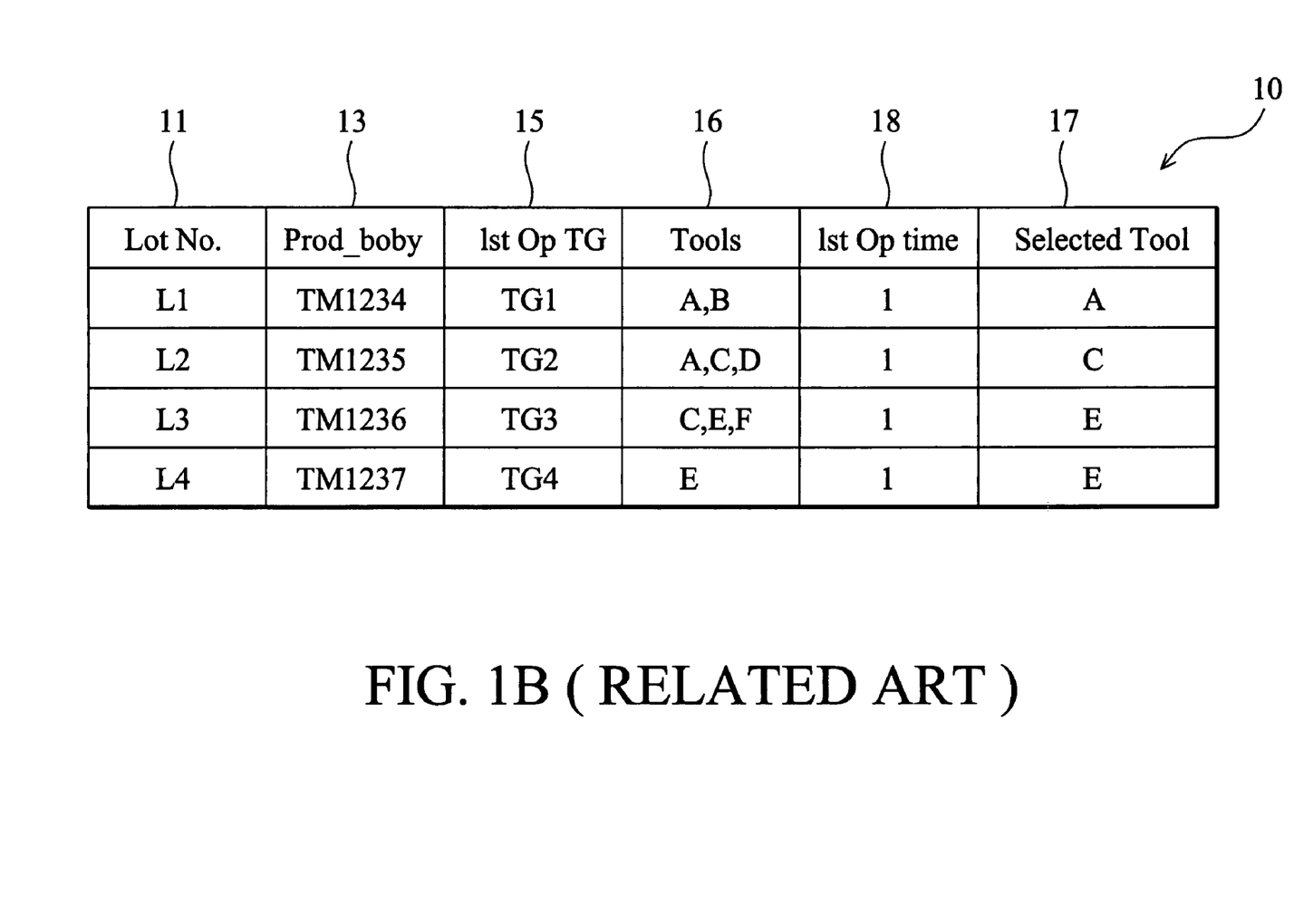
Figure 1C:
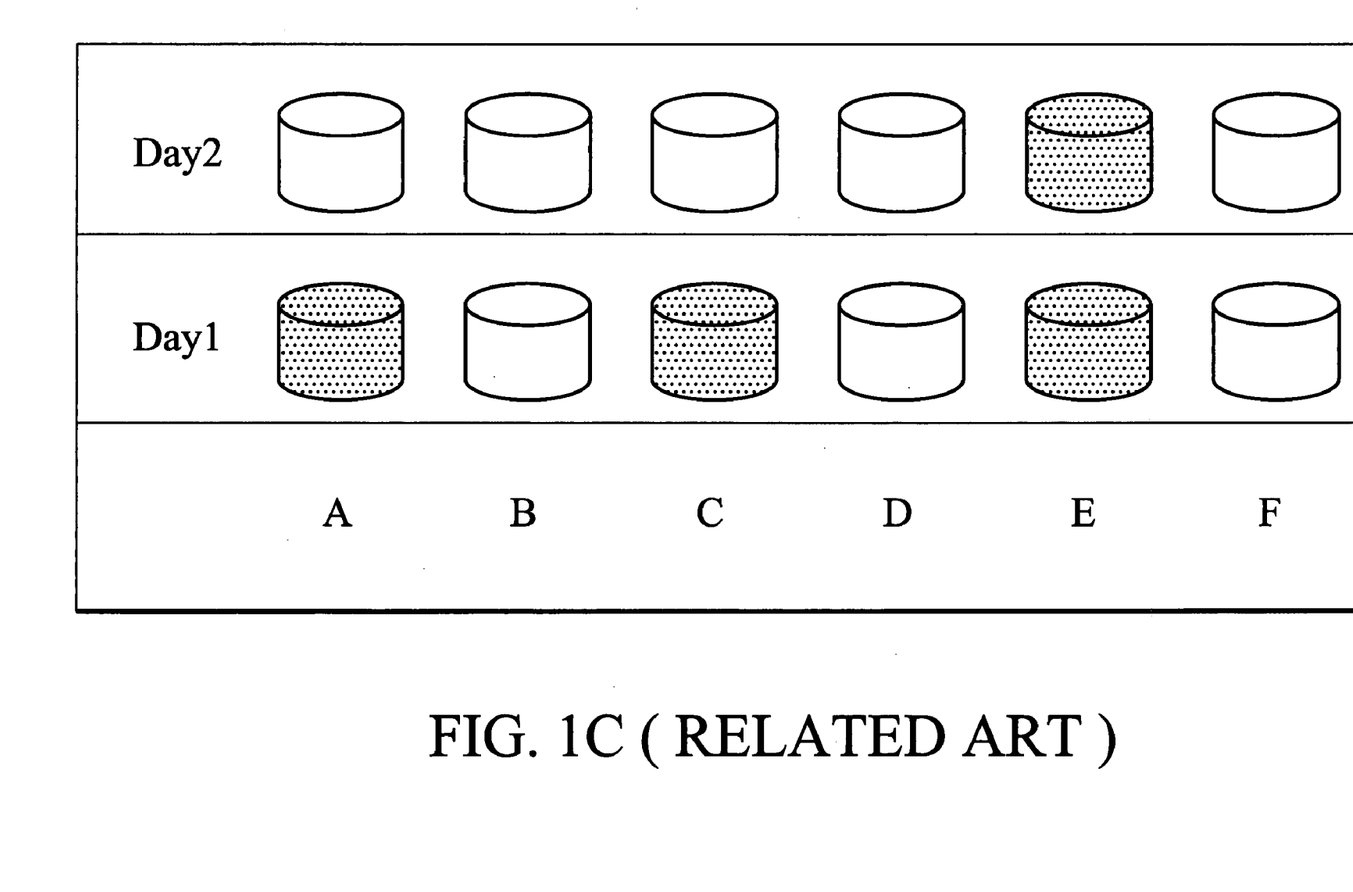

Referring to FIG. 1A, the manufacture of four wafer lots L1, L2, L3, and L4 corresponding respectively to products P1, P2, P3, and P4 are in the planning stage. Wafer lots L1, L2, L3 and L4 are available for operating processes OP11, OP21, OP31, and OP41, which can be executed by tool groups TG1, TG2, TG3 and TG4 respectively. The tool group TG1 contains tools A and B; tool group TG2 contains tools A, C, and D; tool group TG3 contains tools C, E, and F; and tool group TG4 contains tool E. Referring to FIG. 1B, a table 10 contains fields for wafer lot ID number (field 11) and corresponding product ID number (field 13), processing tool group ID number (field 15) and tool components thereof (field 16). After defining the tool groups and processing routes for each wafer lot, one tool is selected from each tool group for processing wafer lots L1, L2, L3 and L4 respectively. The tool selection process operates on the assumption that there is no difference between tools in a particular tool group. In other words, tools put in the same tool group have an equal chance of being selected, and are practical equivalents. If two or more wafer lots are scheduled to be processed by the same tool, the wafer lots are arranged in order according to their committed due date or other ranking algorithms. Table 10 also shows fields for the selected tool (field 17). Tools A, C, E, and E are selected for processing wafer lots L1, L2, L3 and L4 respectively. According to this example, each process takes one work day (shown in field 18 of table 10), and both wafer lots L3 and L4 are to be processed by tool E, therefore either wafer lot L3 or L4 must wait for processing until day 2. The tool utilization is shown in FIG. 1C. Among tools A to F, tools A and C are occupied on Day 1, tool E is occupied on Days 1 and 2, and tools B, D, and F are idle on Days 1 and 2. On Day 1, three out of six tools are occupied, and the utilization rate is 50%; on Day 2, one out of six tools is occupied, and the utilization rate is 17%. Obviously, the capacity of the fabrication system is not fully utilized, and the overall throughput of the fabrication system is low.

Hence, there is a need for a manufacturing system which addresses the low-utilization problems arising from the existing technology.

SUMMARY

It is therefore an object of the invention to provide a manufacturing scheduling system and method for improving tool utilization in a fabrication system.

To achieve this and other objects, the present invention provides a system and method capable of selecting an optimal tool from a tool group for processing an object to enhance the total utilization by assigning a preference index to each tool and selecting the tool with the highest preference from the corresponding tool group accordingly.

According to one embodiment of the invention, a manufacturing scheduling system creates a manufacturing schedule for a fabrication system. The fabrication system contains a plurality of tool groups, each of which contains a plurality of tools for processing objects. Tools belonging to the same tool group have an equivalent fabricating function for processing a particular object. One tool may belong to more than one tool group. Whether a tool belongs to a particular tool group depends on various factors such as manufacturing constraints of objects and the processing function of the tool itself.

The manufacturing scheduling system contains an I/O device, a processor, and a storage device. The I/O device receives a list of component tools from each tool group, wherein the list of component tools contains records of component tools in the corresponding tool group.

The processor, which is coupled to the I/O device, calculates the number of tool groups to which each tool belongs (referred to as a tool group count of the tool), and assigns a preference index to each tool accordingly. The processor also generates a preference-based manufacturing schedule of the object accordingly.

The storage device, which is coupled to the processor, stores the above-mentioned information such as the list of component tools of each tool group, the tool group count and preference index of each tool, and the manufacturing schedule.

The manufacturing scheduling system of the present invention implements a manufacturing scheduling method. First, the tool group count of each tool is calculated. Second, a preference index is assigned to each tool according to the tool group count thereof. A manufacturing schedule for the tool is then determined according to the assigned preference index of each tool and a pre-determined processing route of each object.

In yet another embodiment, the above-mentioned manufacturing scheduling method may take the form of program code embodied in tangible media. When the program code is loaded into and executed by a machine, the machine becomes an apparatus for practicing the invention.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

With reference to the accompanying drawings, embodiments of the present invention are described. In these embodiments, the manufacturing scheduling method and system are used for making a manufacturing schedule of a semiconductor fabrication system. The semiconductor fabrication system contains a plurality of tool groups, each of which contains a plurality of tools for processing wafers. Tools belonging to the same tool group have equivalent fabricating functions for processing a particular wafer lot. One tool may belong to more than one tool group. The sorting of each tool is determined by various factors such as manufacturing constraints of the wafer lots and fabricating function of the tool itself.

Figure 2:
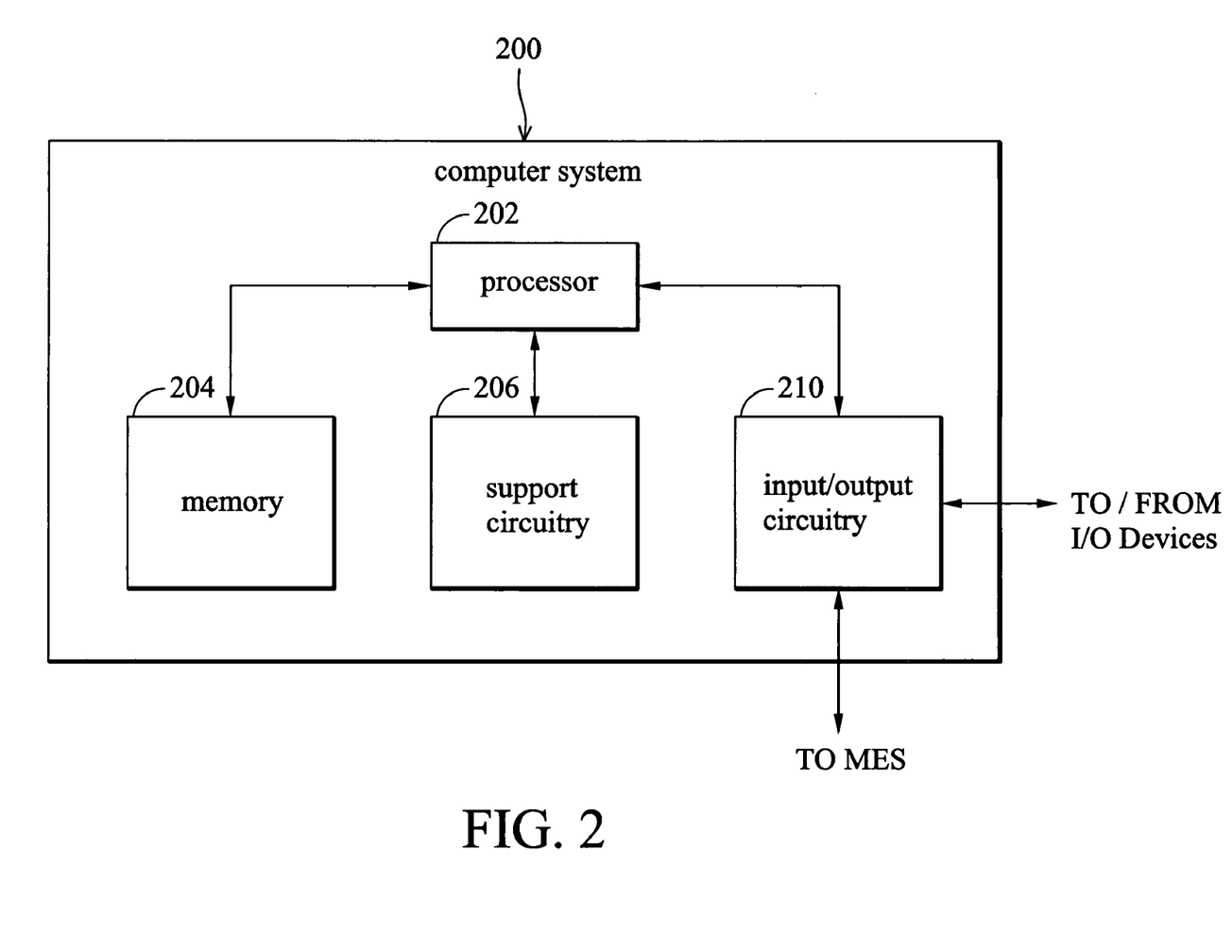
FIG. 2 is a schematic view of the manufacturing scheduling system of the present invention.

FIG. 2 is a block diagram of a computer system. A computer system 200, which is coupled to a manufacture executive system (MES) of the semiconductor fabrication system, operates to execute software routines coding a manufacturing scheduling method of the present invention. The system 200 contains a processor 202 as well as a memory 204 for storing the software routines, and a support circuitry 206 such as power supplies, clock circuits, cache, and the like. The computer system 200 also contains an input/output circuitry 210 that forms an interface between conventional input/output (I/O) devices such as a keyboard, mouse, and display as well as an interface to the MES. The computer system 200 is preferably a general-purpose computer that is programmed to perform wafer manufacturing scheduling in accordance with the present invention.

The I/O device receives a list of component tools for each tool group, wherein the list contains records of component tools of each tool group. The processor calculates the number of tool groups to which each tool belongs, and assigns a preference index to each tool accordingly. The processor also generates a preference-based manufacturing schedule for the tools to process wafer lots accordingly. The storage device stores the above-mentioned information such as the list of component tools in each tool group, the tool group count and preference index of each tool, and the manufacturing schedule. The various routines are discussed in detail with respect to FIGS. 3 and 4A–C.

Figure 3:
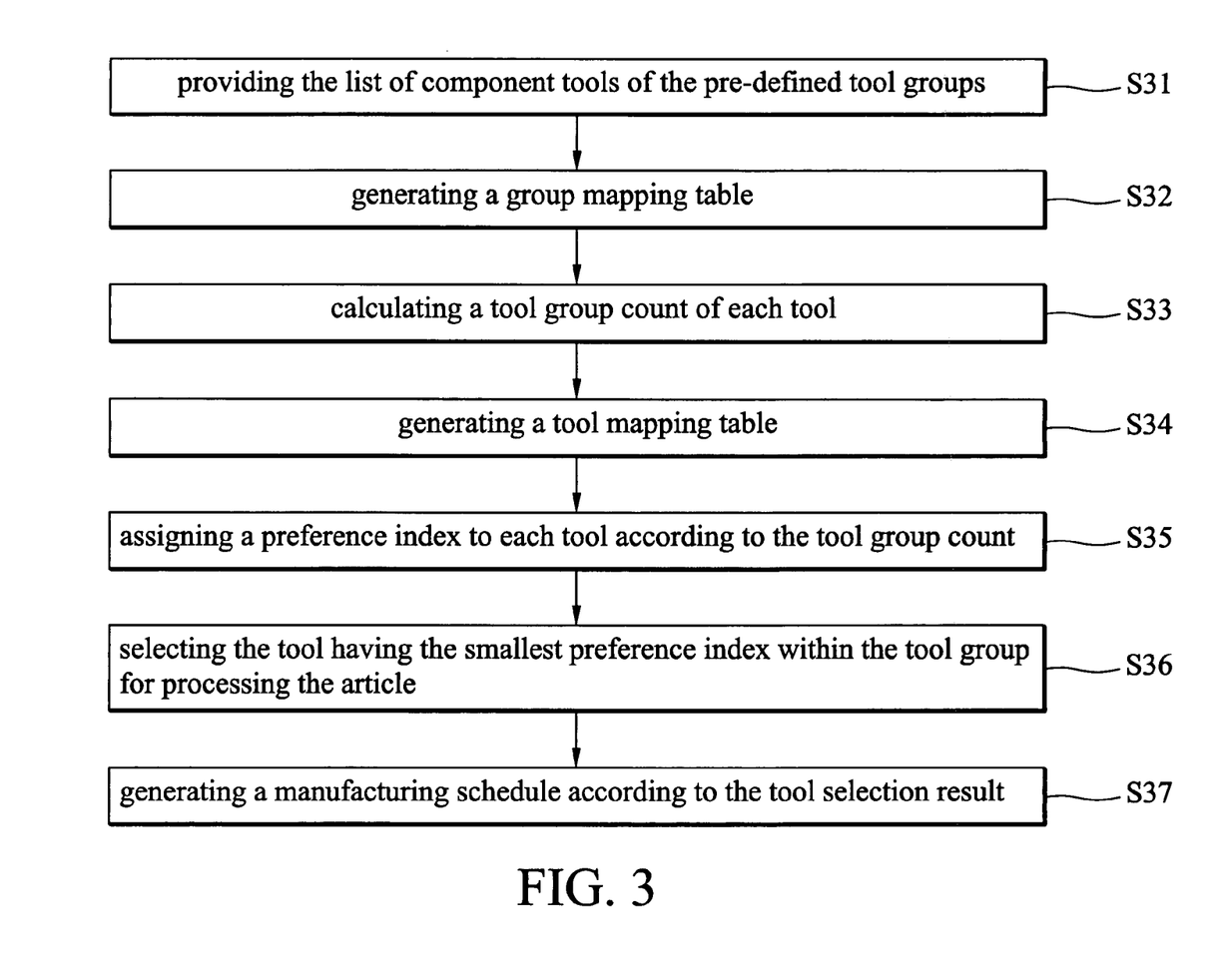
FIG. 3 is a flowchart showing the manufacturing scheduling method of the invention.

FIG. 3 is a flowchart showing the manufacturing scheduling method of the invention. In step S31, the list of the component tools in the pre-defined tool group is provided. Next, a group mapping table is generated (step S32), wherein the group mapping table contains record entries of the component tools in each tool group. In step S33, a tool group count of each tool is calculated based on the group mapping table, wherein the tool group count is the number of tool groups to which the tool belongs. In step S34, a tool mapping table is generated based on the group mapping table, wherein the tool mapping table contains record entries of the tool group count for each tool. In step S35, a preference index is assigned to each tool according to the tool group count, wherein a lower preference index is assigned to the tool with a lower tool group count. In step S36, the tool having the lowest preference index within a particular tool group is selected for processing the wafer lot.

In step S37, a manufacturing schedule is generated according to the tool selection result.

Figure 4A:
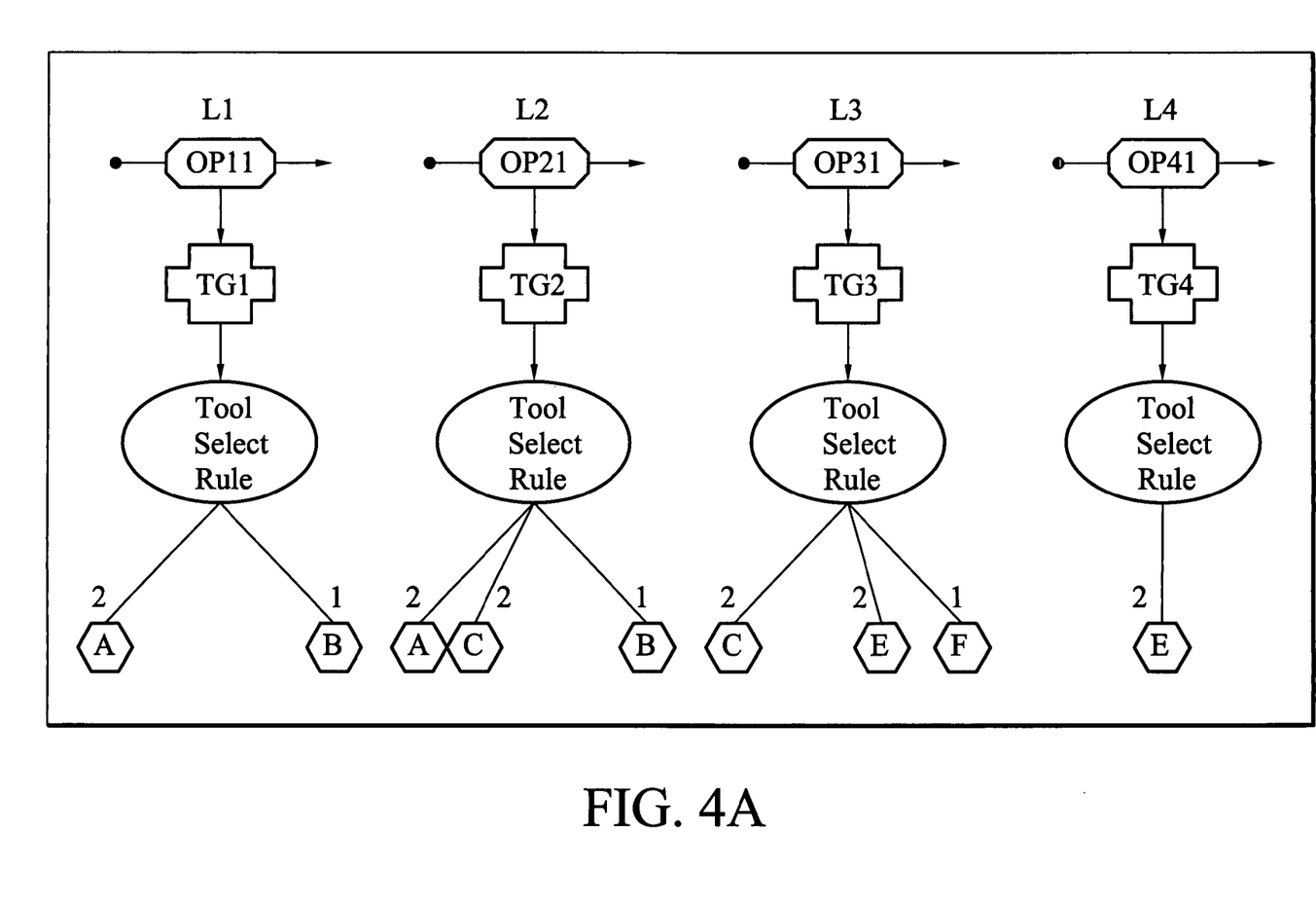
FIGS. 4A to 4C show the operation of manufacturing scheduling according to an embodiment of the present invention.
Figure 4B:
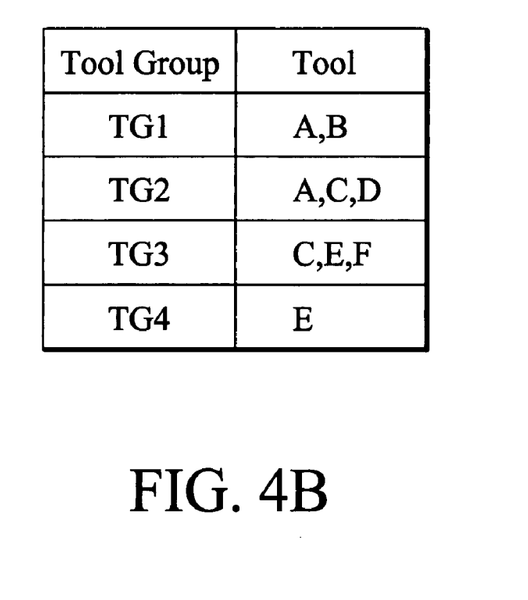
Figure 4C:
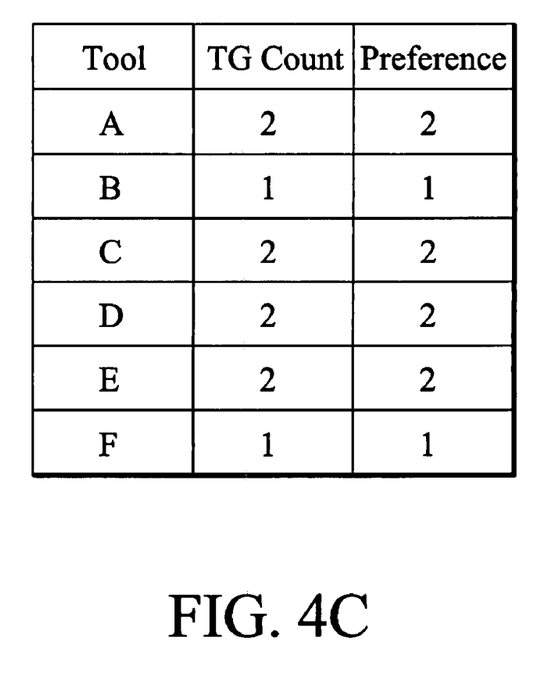

As illustrated in FIG. 4A, manufacture of four wafer lots L1, L2, L3, and L4 corresponding respectively to products P1, P2, P3, and P4 are in the planning stage. Wafer lots L1, L2, L3, and L4 are available for operating processes OP11, OP21, OP31, and OP41, which can be executed by tool groups TG1, TG2, TG3 and TG4 respectively. The tool group TG1 contains tools A and B; tool group TG2 contains tools A, C, and D; tool group TG3 contains tools C, E, and F; and tool group TG4 contains tool E. After defining the tool groups and processing routes for each wafer lot, one tool is selected from each tool group for processing wafer lots L1, L2, L3 and L4 respectively. FIG. 4B is a group mapping table containing a list of the component tools in each tool group. FIG. 4C is a tool mapping table generated based on the group mapping table, wherein the tool mapping table contains a tool group count for each tool. FIG. 4C also shows an assigned preference index of each tool. A tool having a lower tool group count is assigned a lower preference index. The assigned preference indices of tools A to F are 2, 1, 2, 2, 2, and 1 respectively. Next, the tool having the lowest preference index within a particular tool group is selected for processing the wafer lot allocated to the corresponding tool group. According to the above-mentioned selection rule, tool B is selected from tool group TG1, tool D is selected from tool group TG2, tool F is selected within tool group TG3, and tool E is selected from tool group TG4. Tools B, D, E, and F are scheduled for processing wafer lots L1, L2, L3 and L4 respectively. Therefore, all of the products can be processed on Day 1 without being postponed to Day 2. In step S37, a manufacturing schedule is generated according to the tool selection result. On Day 1, four out of six tools are occupied, and the utilization rate is 67%; on Day 2, all six tools are available for other operating processes. Thus the total throughput can increase as a result of the optimal manufacturing scheduling described above.

The scheduling operation can be executed in a defined time interval. Every time the scheduling operation is executed, the tool group count of each tool is recalculated, the preference index is reassigned, and the manufacturing schedule is renewed accordingly.

The method and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 5:
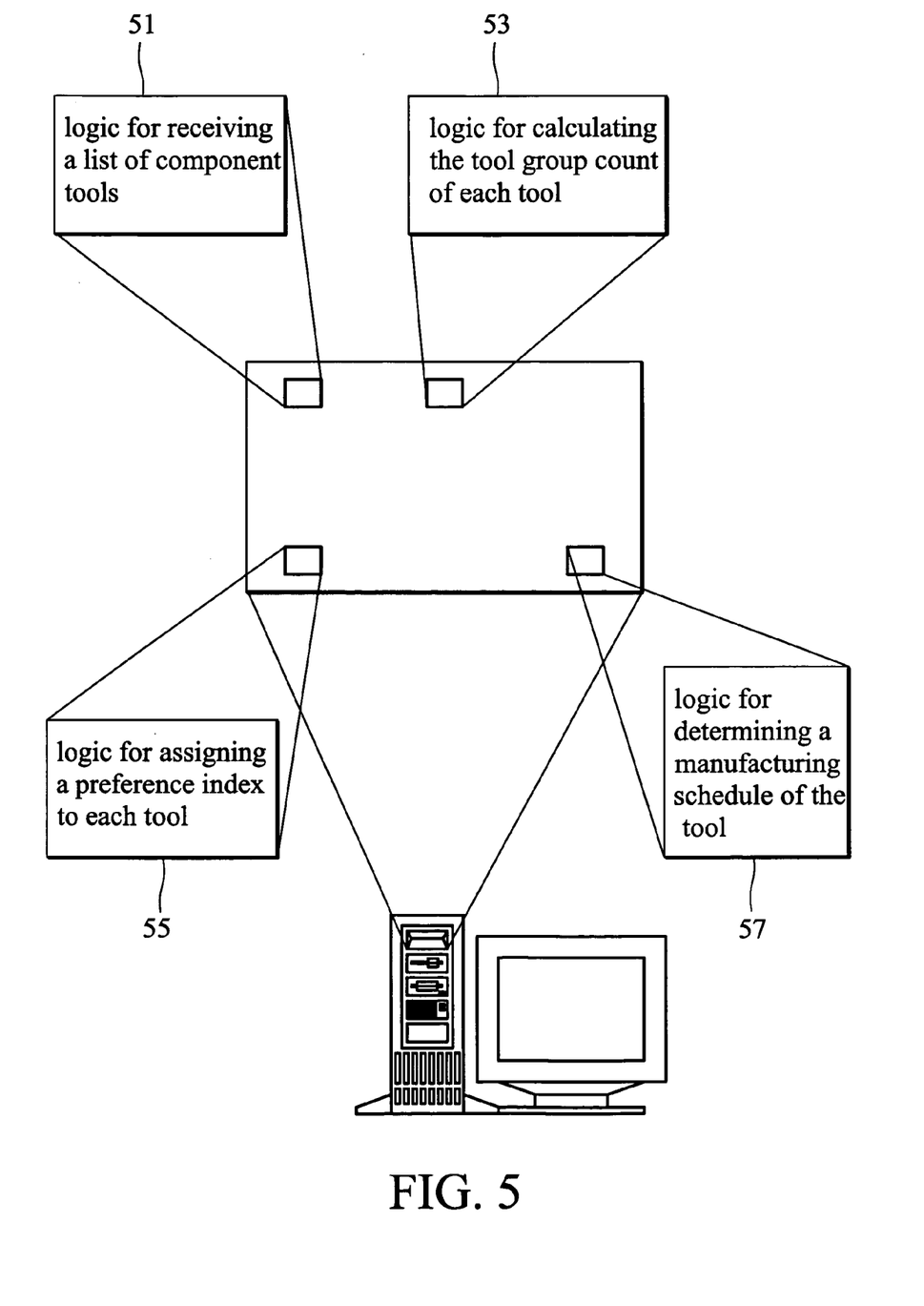
FIG. 5 is a diagram of a storage medium for storing a computer program embodying the method according to the present invention.

The computer program product comprising a computer usable storage medium having computer readable program code embodied in the medium, the computer readable program code comprising computer readable program code 51 for receiving a list of component tools of each of a plurality of tool groups, a computer readable program code 53 for calculating the tool group count of each tool, a computer readable program code 55 for assigning a preference index to each tool according to the tool group count, and a computer readable program code 57 for determining a manufacturing schedule of the tool according to the tool selection result.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for manufacturing scheduling, comprising:
   an I/O device for receiving a list of component tools in a pre-defined tool group, which comprises at least one tool for processing an object, wherein the list contains records of component tools in the tool group;
   a processor for calculating the number of tool groups to which each tool belongs, assigning a preference index to each tool accordingly, and generating a preference-based manufacturing schedule of the tool accordingly; and
   a storage device for storing the list of component tools in the tool group, the tool group count and preference index of each tool, and the manufacturing schedule.

2. The system as claimed in claim 1, wherein the processor further generates a group mapping table which contains records of the component tools in each tool group.

3. The system as claimed in claim 1, wherein the processor further generates a tool mapping table which contains tool group count for each tool.

4. The system as claimed in claim 1, wherein the processor assigns a smaller preference index to the tool with a lower tool group count.

5. The system as claimed in claim 1, wherein the processor selects the tool having the lowest preference index within the group for fabricating the object.

6. The system as claimed in claim 1, wherein the tool is a semiconductor processing tool.

7. The system as claimed in claim 6, wherein the semiconductor processing tool is a circuit-probing tool.

8. A method of manufacturing, comprising:
   providing a plurality of tool groups, wherein each tool group has at least one tool for processing an object;
   calculating the tool group count of each tool, wherein the tool group count is the number of tool groups to which the tool belongs;
   assigning a preference index to each tool according to the tool group count;
   selecting one of the component tools from the tool group according to the assigned preference index of each tool; and
   processing the object using the selected tool.

9. The method as claimed in claim 8, wherein the tool group count calculating step further comprises generating a group mapping table which contains records of the component tools within the tool group.

10. The method as claimed in claim 8, wherein the preference determining step further comprises generating a tool mapping table which contains the tool group count for each tool.

11. The method as claimed in claim 8, wherein the preference determining step further comprises assigning a lower preference index to the tool with a lower tool group count.

12. The method as claimed in claim 11, wherein the manufacturing schedule determining step further comprises selecting the tool having the lowest preference index within the tool group for processing the object.

13. The method as claimed in claim 8, wherein the tool is a semiconductor processing tool.

14. The method as claimed in claim 13, wherein the semiconductor processing tool is a circuit-probing tool.

15. A computer readable storage medium for storing a computer program providing a method of manufacturing scheduling, the method comprising:
   receiving a plurality of tool groups, wherein each tool group has at least one tool for processing an object;
   calculating the tool group count of each tool, wherein the tool group count is the number of tool groups to which the tool belongs;
   assigning a preference index to each tool according to the tool group count;
   selecting one of the component tools from the tool group according to the assigned preference index of each tool;
   generating a manufacturing schedule for processing the object according to the assigned preference index of each tool.

16. The storage medium as claimed in claim 15, wherein the tool group calculating step further comprises generating a group mapping table which contains records of the component tools within the tool group.

17. The storage medium as claimed in claim 15, wherein the preference determining step further comprises generating a tool mapping table which contains the tool group count for each tool.

18. The storage medium as claimed in claim 15, wherein the preference determining step includes assigning a lower preference index to the tool with a lower tool group count.

19. The storage medium as claimed in claim 18, wherein the tool selection step includes selecting the tool having the lowest preference index within the tool group for processing the object.

20. The storage medium as claimed in claim 15, wherein the tool is a semiconductor processing tool.

21. The storage medium as claimed in claim 20, wherein the semiconductor processing tool is a circuit-probing tool.

* * * * *